June 2, 1959        A. B. GOLFF        2,889,184
PLATFORM UNIT AND ASSEMBLY
Filed Dec. 4, 1957
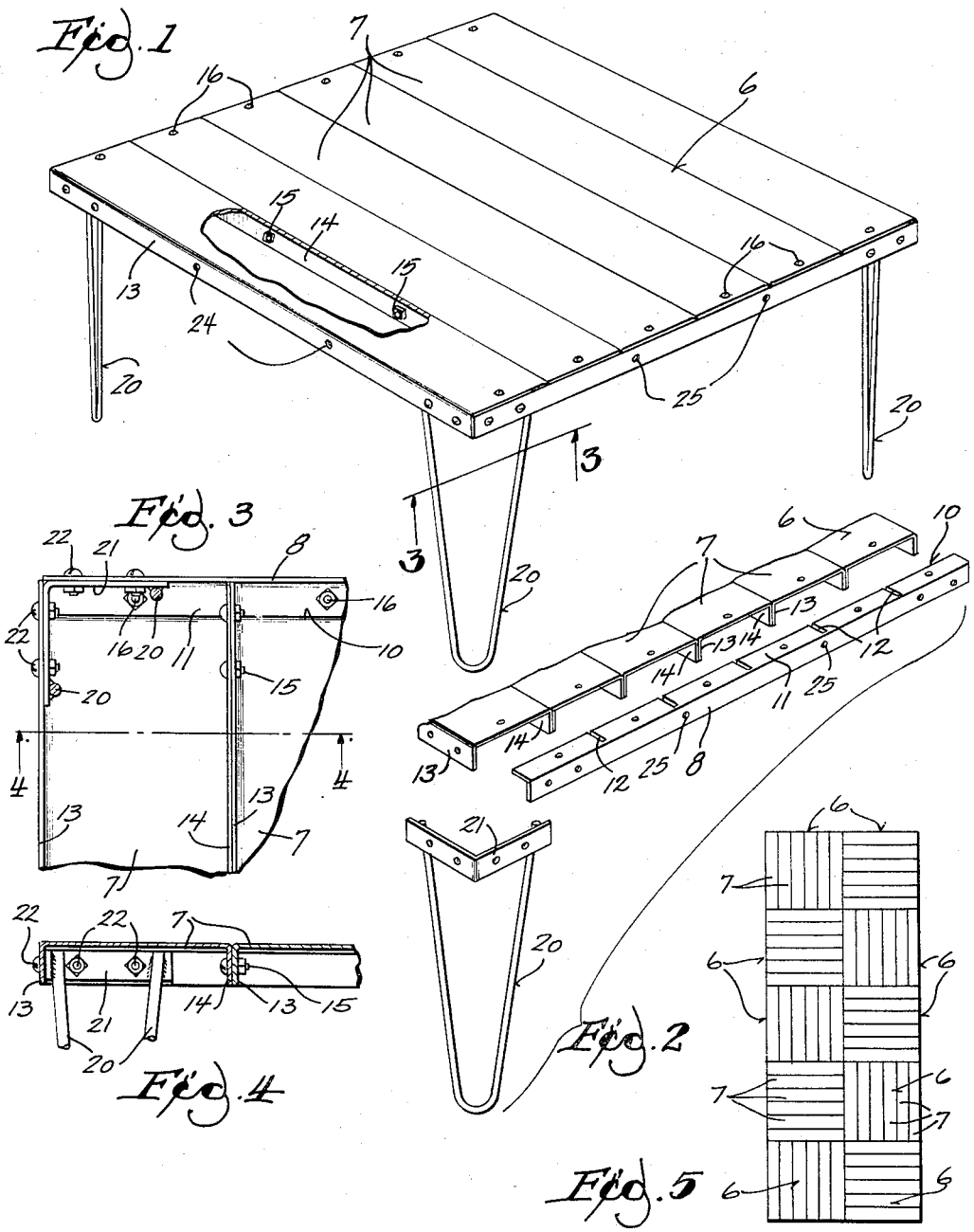
INVENTOR.
ANTHONY B. GOLFF
BY
Wheeler, Wheeler & Wheeler
ATTORNEYS

United States Patent Office 2,889,184
Patented June 2, 1959

2,889,184
PLATFORM UNIT AND ASSEMBLY

Anthony B. Golff, Falls Church, Va., assignor to Hartwig Incorporated, Milwaukee, Wis., a corporation of Wisconsin Application December 4, 1957, Serial No. 700,699

5 Claims. (Cl. 311—1)

This invention relates to a platform unit and assembly. The unit may be assembled with other units and used as a table or display platform or as a stage or the like, it being possible to make up platforms of almost any desired dimensions.

Identical lengths of channel are bolted to each other and to terminal angles and supporting legs, desirably constructing square assemblages which may, in turn, be connected together as units of a larger assemblage in which, desirably, the channels constituting the smaller components are set at right angles to each other. The angles not only assist in connecting the channels together, taking the strain off the flanges of individual channels, but also serve as a means for mounting the corner legs and connecting the square components to other square components in any desired relationship. For this purpose, the horizontal flanges of the end angles are notched to receive paired flanges of adjacent channels while the vertical flanges and the unnotched portions of the horizontal flanges are apertured to receive connecting bolts such as also connect contiguous flanges of the channel members.

In the drawings:

Fig. 1 is a view in perspective of a substantially square platform unit assemblage of channels and terminal angles and supporting legs, a portion of one of the channels being broken away to expose connecting bolts.

Fig. 2 is a fragmentary view in perspective showing in separated relationship the several component parts of the device of Fig. 1.

Fig. 3 is an inverted plan view on an enlarged scale of a fragment of the device of Fig. 1, the view being taken in section through one of the legs in the plane indicated at 3—3 in Fig. 1.

Fig. 4 is a detail view taken in section on the line 4—4 of Fig. 3.

Fig. 5 is a plan view on a greatly reduced scale showing a composite structure based upon a number of the components shown in Fig. 1.

The unitary assemblage shown in Fig. 1 comprises a square platform 6 made up of a number of channels 7 of uniform length almost equal to their combined width. The difference is made up by the thickness of the vertical flanges 8 of identical angles 10 which have horizontal flanges at 11 with slots at 12 so spaced and of such width as to receive paired flanges 13, 14 of adjacent inverted channels 7. The adjacent flanges 13, 14 are fastened together, as by bolts 15 (Figs. 3 and 4). The channels are also fastened together by bolts 16 which extend downwardly through the web portions of each channel and through the apertured horizontal flange portions 11 of the respective angles 10 intermediate the slots 12. When the thickness of the vertical flanges 8 of angles 10 is added to the length of the inverted channels 7, the resulting platform is substantially perfectly square and extremely strong. Hairpin-type legs 20 may be used to support the corners, these legs having their upper ends welded to the angles 21 which are held by bolts 22 to the vertical flange 8 of an angle 10 and to the vertical flange 13 of a channel 7 at the end of the series, as shown in Figs. 3 and 4.

The resulting platform 6 constitutes a self-supporting unit and may be used individually. It may, however, also be bolted to other like primary units by bolts received through apertures provided at 24 in the flanges 13 and 14 of the channels at the ends of the series and in correspondingly spaced apertures 25 in the vertical flanges of the angles 10. Since the various apertures 24 and 25 are uniformly spaced on all four sides of the primary unit, the several primary units 6 connected by bolts extending through these correspondingly spaced apertures may have their component channels set at right angles to each other throughout the series in the manner suggested on a reduced scale in Fig. 5. Thus the area of the resulting stage or platform may constitute any multiple of the area of a single component unit. Not only are the several component units separable, each from the other, but each is readily demountable to comprise in readily assembled form, separate channels, flanges and legs which are easily nestable compactly for storage or transportation.

While I do not wish to be limited to the details of the materials used, it may be helpful to note merely by way of exemplification that in practice each of the several units comprises six aluminum channels which are 10" wide and just short of 60" in length and made of 1/16" thick sheet metal, the slots 12 in the respective angles 10 being 3/16" wide to receive a pair of contiguous flanges 13 and 14 with ample clearance. The resulting table or platform is 5 feet by 5 feet.

The terminal angles 10 are desirably somewhat heavier, being made of 1/8" material, the length of the channels being less than 5 feet by substantially a quarter inch. The dimensions are not critical since the flanges of the angles and channels can be sprung somewhat when bolted together.

The bars 20 which constitute the hairpin legs are 1/2" cold rolled steel, chrome plated.

Depending on the height of the legs, the resulting platform may be at any desired level. Depending on the height of the legs and the number of channels combined, the platform may be square in accordance with preferred practice for use as a table or display platform, or it may be narrower in relationship to its length and low, to serve as a bench.

What is claimed is:

1. A portable platform comprising a plurality of inverted channels having web portions constituting the surface of the platform and having depending flanges disposed side by side, together with terminal angles having generally horizontal flanges provided with slots in which the side by side flanges of said channels are severally engaged in pairs, portions of said horizontal flanges being connected to the channel webs to mount the channels in assembly.

2. The combination recited in claim 1 in further combination with means connecting the side by side flanges of the inverted channels to each other in a series substantially equal in its extent to the combined length of the respective channels and substantially vertical flanges with which the terminal angles are provided.

3. The device of claim 1 in further combination with legs disposed at the corners of the platform and comprising angles with which the respective legs are connected and each of which is detachably fastened to the end flange of a channel at the end of the series of channels and to the substantially vertical flange of a terminal angle.

4. The combination set forth in claim 1 in further combination with a plurality of like platform units each of which is square in plan and each of which is provided with corner legs to constitute a supporting platform structure, the several platform units having generally upright flanges at their several sides all provided with apertures at substantially uniform spacing from each other and from the corners of said units, and connecting means extending through the apertures of continuous flanges of the several units to connect said units to provide a continuous platform.

5. The device of claim 4 in which the several platform units as connected have their respective channels at right angles to the channels of adjacent units.

References Cited in the file of this patent

UNITED STATES PATENTS

| | | |
|---|---|---|
| 893,703 | Butler | July 21, 1908 |
| 1,329,357 | Baxter | Feb. 3, 1920 |
| 1,374,613 | Stuebing | Apr. 12, 1921 |
| 1,924,989 | Hallwell | Aug. 29, 1933 |
| 2,694,609 | Trafford | Nov. 16, 1954 |
| 2,714,540 | Diehm | Aug. 2, 1955 |
| 2,746,823 | Sand | May 22, 1956 |
| 2,768,044 | Jaffe | Oct. 23, 1956 |
| 2,783,107 | Gacht | Feb. 26, 1957 |